United States Patent
Higashidozono (10) Patent No.: US 12,435,794 B2
(45) Date of Patent: Oct. 7, 2025

(54) FLUID CONTROL VALVE

(71) Applicant: EAGLE INDUSTRY CO., LTD., Tokyo (JP)

(72) Inventor: Hideki Higashidozono, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 3 days.

(21) Appl. No.: 18/563,717

(22) PCT Filed: May 25, 2022

(86) PCT No.: PCT/JP2022/021401
§ 371 (c)(1),
(2) Date: Nov. 22, 2023

(87) PCT Pub. No.: WO2022/255188
PCT Pub. Date: Dec. 8, 2022

(65) Prior Publication Data
US 2024/0271705 A1    Aug. 15, 2024

(30) Foreign Application Priority Data
May 31, 2021   (JP) .................................. 2021-091743

(51) Int. Cl.
*F16K 1/42* (2006.01)
*F16K 1/36* (2006.01)

(52) U.S. Cl.
CPC . *F16K 1/42* (2013.01); *F16K 1/36* (2013.01)

(58) Field of Classification Search
CPC .......... F16K 1/42; F16K 1/36; F16K 17/0466; F16K 17/105; F16K 25/005; F16K 31/406
See application file for complete search history.

(56) References Cited

U.S. PATENT DOCUMENTS

| | | | |
|---|---|---|---|
| 1,614,002 A | 1/1927 | Horton | A62C 35/605 |
| 2,267,515 A | 12/1941 | Wilcox | F16K 31/0627 |
| 3,252,480 A * | 5/1966 | Odendahl | F16K 47/04 |
| | | | 251/126 |
| 3,360,304 A | 12/1967 | Adams | B61K 7/12 |
| 3,483,888 A | 12/1969 | Hugo | F16K 15/046 |

(Continued)

FOREIGN PATENT DOCUMENTS

| | | | |
|---|---|---|---|
| CN | 110260001 | 9/2019 | F16K 15/016 |
| CN | 111279076 | 6/2020 | F04B 27/18 |

(Continued)

OTHER PUBLICATIONS

U.S. Appl. No. 18/019,057, filed Jan. 31, 2023, Fukudome et al.

(Continued)

*Primary Examiner* — Patrick C Williams
(74) *Attorney, Agent, or Firm* — HAYES SOLOWAY P.C.

(57) ABSTRACT

Provided is a fluid control valve that is less likely to malfunction due to contamination. The fluid control valve includes a valve housing which includes an inflow passage and a discharge passage; a valve seat which is disposed between the inflow passage and the discharge passage, and a valve body which includes a guide portion guided by an inner surface of the valve housing and a seal portion brought into contact with and separated from the valve seat, the guide portion of the valve body includes a flat surface and a tapered surface tapered toward a side of the seal portion.

6 Claims, 5 Drawing Sheets

(56) References Cited

U.S. PATENT DOCUMENTS

| | | | | |
|---|---|---|---|---|
| 3,841,354 | A * | 10/1974 | McDonnell | A61M 5/16881 |
| | | | | D24/129 |
| 4,085,921 | A | 4/1978 | Ueda et al. | F16K 31/06 |
| 4,364,615 | A | 12/1982 | Euler | F16C 27/04 |
| 4,579,145 | A | 4/1986 | Leiber | F16H 61/0251 |
| 4,615,358 | A | 10/1986 | Hammond | F15B 13/0402 |
| 4,632,359 | A * | 12/1986 | Tooth | F16K 47/02 |
| | | | | 181/269 |
| 4,634,434 | A * | 1/1987 | Marino, Jr. | F16K 47/06 |
| | | | | 251/126 |
| 4,895,192 | A | 1/1990 | Mortenson | F01M 11/04 |
| 4,917,150 | A | 4/1990 | Koch | F16K 31/0606 |
| 4,979,542 | A | 12/1990 | Mesenich | F02M 47/027 |
| 4,998,559 | A | 3/1991 | McAuliffe | F16H 61/0251 |
| 5,060,695 | A | 10/1991 | McCabe | G05D 16/2024 |
| 5,217,047 | A | 6/1993 | McCabe | F16H 16/0251 |
| 5,263,694 | A | 11/1993 | Smith | B60G 15/068 |
| 5,702,235 | A | 12/1997 | Hirota | F04B 27/1804 |
| 5,778,932 | A | 7/1998 | Alexander | G05D 16/2024 |
| 6,010,312 | A | 1/2000 | Suitou | F04B 27/1804 |
| 6,155,391 | A | 12/2000 | Kashiwagi et al. | F16F 9/348 |
| 6,161,585 | A | 12/2000 | Kolchinsky | F05D 16/2024 |
| 6,361,283 | B1 | 3/2002 | Ota | F04B 27/1084 |
| 6,481,976 | B2 | 11/2002 | Kimura | F04B 27/1804 |
| 6,981,689 | B2 * | 1/2006 | Mihaylov | F16K 47/12 |
| | | | | 251/126 |
| 7,040,595 | B2 | 5/2006 | Hirota | F16K 31/02 |
| 7,533,687 | B2 | 5/2009 | Uemura | F16K 27/048 |
| 7,726,949 | B2 | 6/2010 | Taguchi | F04B 1/26 |
| 8,021,124 | B2 | 9/2011 | Umemura | F04B 27/1804 |
| 8,079,827 | B2 | 12/2011 | Iwa | F04B 27/1804 |
| 8,225,818 | B1 | 7/2012 | Stephens | F15B 13/0442 |
| 8,651,826 | B2 | 2/2014 | Futakuchi | F04B 27/1804 |
| 8,844,900 | B2 * | 9/2014 | Hoppe | F16K 31/061 |
| | | | | 335/277 |
| 9,022,346 | B2 | 5/2015 | Najmolhoda | F16K 31/0613 |
| 9,027,598 | B2 | 5/2015 | Schneider | F16K 31/0613 |
| 9,132,714 | B2 | 9/2015 | Futakuchi | F04B 27/1804 |
| 9,297,373 | B2 | 3/2016 | Bagagli | F16K 15/026 |
| 9,400,027 | B2 | 7/2016 | Imaizumi | F16F 1/32 |
| 9,453,518 | B2 | 9/2016 | Schulz | F15B 13/043 |
| 9,581,149 | B2 | 2/2017 | Ota et al. | F04B 27/1804 |
| 9,581,150 | B2 | 2/2017 | Ota et al. | F04B 27/1804 |
| 9,732,874 | B2 | 8/2017 | Saeki | F16K 31/0603 |
| 9,874,286 | B2 | 1/2018 | Bagagli | F16K 15/12 |
| 10,113,539 | B2 | 10/2018 | Sugamura | F04B 27/1804 |
| 10,519,944 | B2 | 12/2019 | Taguchi | F04B 27/1804 |
| 10,539,269 | B2 * | 1/2020 | Divisi | F16N 7/32 |
| 10,557,463 | B2 | 2/2020 | Sugamura | F04B 27/1804 |
| 10,690,125 | B2 | 6/2020 | Hayama | F04B 27/18 |
| 10,784,804 | B2 | 9/2020 | Sasaki | H02P 25/022 |
| 10,837,431 | B2 | 11/2020 | Tonegawa | F04B 49/22 |
| 11,085,431 | B2 | 8/2021 | Fukudome et al. | F16K 31/06 |
| 2001/0003573 | A1 | 6/2001 | Kimura et al. | 417/222.2 |
| 2002/0134444 | A1 | 9/2002 | Isobe | F16K 27/041 |
| 2003/0145613 | A1 | 8/2003 | Sasaki | F16K 31/0637 |
| 2003/0197141 | A1 | 10/2003 | Kajitani | F16L 47/00 |
| 2003/0202885 | A1 | 10/2003 | Taguchi | F04B 49/00 |
| 2004/0045305 | A1 | 3/2004 | Murase | F25B 49/022 |
| 2004/0165994 | A1 | 8/2004 | Umemura | F04B 27/1804 |
| 2005/0076959 | A1 | 4/2005 | Yamamoto | F16K 31/0624 |
| 2005/0151310 | A1 | 7/2005 | Rodeffer | F16F 1/32 |
| 2007/0214814 | A1 | 9/2007 | Umemura et al. | |
| 2007/0264134 | A1 | 11/2007 | Hirota | F04B 27/1804 |
| 2008/0138213 | A1 | 6/2008 | Umemura et al. | 417/222.2 |
| 2008/0175727 | A1 | 7/2008 | Umemura et al. | F04B 49/22 |
| 2009/0108221 | A1 | 4/2009 | Umemura et al. | 251/129.15 |
| 2009/0114871 | A1 | 5/2009 | Iwa | F04B 27/14 |
| 2009/0183786 | A1 | 7/2009 | Iwa | 137/487.5 |
| 2009/0256091 | A1 | 10/2009 | Nordstrom | F16K 31/0613 |
| 2010/0019406 | A1 | 1/2010 | Shoji et al. | F16K 1/34 |
| 2010/0282991 | A1 | 11/2010 | Okamoto | F16K 31/02 |
| 2011/0041941 | A1 | 2/2011 | Sonsterod | F16K 15/14 |
| 2011/0061749 | A1 | 3/2011 | Okamoto | F16K 31/0655 |
| 2011/0089352 | A1 | 4/2011 | Morgan | F16K 11/0716 |
| 2011/0203888 | A1 | 8/2011 | Sonsterod | F16F 9/32 |
| 2012/0056113 | A1 | 3/2012 | Tano | F04B 27/1804 |
| 2012/0198992 | A1 | 8/2012 | Futakuchi et al. | 91/505 |
| 2012/0198993 | A1 | 8/2012 | Fukudome | 91/505 |
| 2012/0211686 | A1 | 8/2012 | Okamoto | F16K 31/0655 |
| 2013/0291963 | A1 | 11/2013 | Futakuchi et al. | 137/487.5 |
| 2014/0099214 | A1 | 4/2014 | Fukudome | 417/222.2 |
| 2014/0130916 | A1 | 5/2014 | Saeki | F16K 31/0613 |
| 2014/0294632 | A1 | 10/2014 | Kondo et al. | 417/434 |
| 2014/0369862 | A1 | 12/2014 | Ota et al. | F04B 27/1804 |
| 2015/0021131 | A1 | 1/2015 | Wootten | F16F 9/348 |
| 2015/0027573 | A1 | 1/2015 | Ochiai | F15B 13/0402 |
| 2015/0044067 | A1 | 2/2015 | Ota et al. | F04B 27/1804 |
| 2015/0068628 | A1 | 3/2015 | Iwa | 137/625.65 |
| 2015/0104334 | A1 | 4/2015 | Ota et al. | F04B 27/1804 |
| 2015/0275874 | A1 | 10/2015 | Ota | F04B 27/1804 |
| 2015/0345655 | A1 | 12/2015 | Higashidozono | 137/624.27 |
| 2016/0053755 | A1 | 2/2016 | Taguchi | F04B 49/22 |
| 2016/0290326 | A1 | 10/2016 | Sugamura | F04B 27/1804 |
| 2017/0284562 | A1 | 10/2017 | Hayama | F16K 41/00 |
| 2018/0149395 | A1 | 5/2018 | Takada et al. | F25B 41/06 |
| 2018/0156345 | A1 | 6/2018 | Kanda | F15B 13/0431 |
| 2018/0187793 | A1 | 7/2018 | Futakuchi | F04B 39/08 |
| 2018/0291888 | A1 | 10/2018 | Tonegawa et al. | F04B 49/22 |
| 2019/0162175 | A1 | 5/2019 | Higashidozono | F04B 27/18 |
| 2020/0032781 | A1 | 1/2020 | Higashidozono | F16K 31/0624 |
| 2020/0088178 | A1 | 3/2020 | Fukudome et al. | F16K 31/06 |
| 2020/0309105 | A1 | 10/2020 | Hayama et al. | F04B 27/18 |
| 2020/0318624 | A1 | 10/2020 | Hayama | F04B 27/18 |
| 2020/0325881 | A1 | 10/2020 | Hayama et al. | F04B 27/18 |
| 2020/0332786 | A1 | 10/2020 | Hayama | F04B 27/1804 |
| 2020/0362974 | A1 | 11/2020 | Hayama et al. | F16K 11/24 |
| 2020/0370545 | A1 | 11/2020 | Hayama et al. | F04B 27/18 |
| 2021/0372396 | A1 | 12/2021 | Kurihara | G05D 7/0635 |
| 2021/0404570 | A1 | 12/2021 | Hayama et al. | F16K 17/04 |

FOREIGN PATENT DOCUMENTS

| | | | |
|---|---|---|---|
| CN | 111316028 | 6/2020 | F16K 31/06 |
| CN | 111417780 | 7/2020 | F04B 27/18 |
| EP | 2594794 | 5/2013 | F04B 27/18 |
| EP | 3296599 | 3/2018 | F16K 1/34 |
| EP | 3366957 | 8/2018 | F16K 1/34 |
| EP | 3726054 | 10/2020 | F04B 27/18 |
| JP | 5682358 | 7/1981 | G03B 15/00 |
| JP | 5740945 | 8/1982 | B21B 39/14 |
| JP | 4106576 | 9/1992 | F16K 31/06 |
| JP | 5346276 | 12/1993 | F25B 41/96 |
| JP | 626454 | 2/1994 | F04B 27/08 |
| JP | H0711313 | 2/1995 | F16K 1/34 |
| JP | H8159320 | 6/1996 | F16K 31/04 |
| JP | H10220926 | 8/1998 | F25B 41/06 |
| JP | 11287281 | 10/1999 | F16F 9/348 |
| JP | 2000304152 | 11/2000 | F16D 48/02 |
| JP | 2001012534 | 1/2001 | F16F 9/46 |
| JP | 2001153495 | 6/2001 | F16K 31/06 |
| JP | 2001153498 | 6/2001 | F16K 31/06 |
| JP | 2001165055 | 6/2001 | F04B 27/14 |
| JP | 2002216803 | 8/2002 | H01M 8/02 |
| JP | 2003004160 | 1/2003 | F16K 31/04 |
| JP | 2003301772 | 10/2003 | |
| JP | 2003314745 | 11/2003 | F16K 51/02 |
| JP | 2004003468 | 1/2004 | F04B 27/14 |
| JP | 2004101163 | 4/2004 | F25B 41/06 |
| JP | 2005307817 | 11/2005 | F04B 27/14 |
| JP | 2005351605 | 12/2005 | F16K 1/38 |
| JP | 2006153204 | 6/2006 | F16K 31/04 |
| JP | 2007247512 | 9/2007 | F04B 27/14 |
| JP | 2008157031 | 7/2008 | F04B 27/14 |
| JP | 2008190574 | 8/2008 | F16K 31/06 |
| JP | 2009030752 | 2/2009 | F16K 31/06 |
| JP | 2009115204 | 5/2009 | F16K 31/04 |
| JP | 2009221965 | 10/2009 | F04B 27/14 |
| JP | 2009275550 | 11/2009 | F04B 49/00 |
| JP | 2010019406 | 1/2010 | F16K 31/04 |
| JP | 2010270900 | 12/2010 | F16K 1/00 |
| JP | 2011501798 | 1/2011 | F16K 15/14 |
| JP | 2011525962 | 9/2011 | F16F 9/32 |

(56) References Cited

FOREIGN PATENT DOCUMENTS

| | | | | |
|---|---|---|---|---|
| JP | 4822735 | 11/2011 | ............ | A43B 23/24 |
| JP | 2012144986 | 8/2012 | ............ | F04B 27/14 |
| JP | 2012211579 | 11/2012 | ............ | F04B 27/14 |
| JP | 2013024135 | 2/2013 | ............ | F04B 27/14 |
| JP | 5167121 | 3/2013 | ............ | F04B 27/14 |
| JP | 2013100915 | 5/2013 | ............ | F15K 31/06 |
| JP | 2014080927 | 5/2014 | ............ | F04B 27/16 |
| JP | 2014092207 | 5/2014 | ............ | F16K 31/06 |
| JP | 2014095463 | 5/2014 | ............ | F16K 31/06 |
| JP | 2014194180 | 10/2014 | ............ | F04B 27/14 |
| JP | 2015075054 | 4/2015 | ............ | F04B 27/14 |
| JP | 20151168 | 5/2015 | ............ | F04B 27/14 |
| JP | 2015137546 | 7/2015 | ............ | F04B 27/14 |
| JP | 2015152069 | 8/2015 | ............ | F16K 1/36 |
| JP | 2015178795 | 10/2015 | ............ | F04B 27/14 |
| JP | 5983539 | 8/2016 | ............ | F04B 27/18 |
| JP | 2016196825 | 11/2016 | ............ | F04B 27/18 |
| JP | 2016196876 | 11/2016 | ............ | F04B 27/18 |
| JP | 2016205404 | 12/2016 | ............ | F04B 27/18 |
| JP | 6135521 | 5/2017 | ............ | F04B 27/18 |
| JP | 2017089832 | 5/2017 | ............ | F16K 31/06 |
| JP | 2017180525 | 10/2017 | ............ | F16K 31/04 |
| JP | 2018015739 | 2/2018 | ............ | C02F 1/46 |
| JP | 2018035840 | 5/2018 | | |
| JP | 2018115684 | 7/2018 | ............ | B60G 17/08 |
| JP | 2018135954 | 8/2018 | ............ | F16K 31/06 |
| JP | 2018179087 | 11/2018 | ............ | F16K 31/06 |
| JP | 2019131725 | 8/2019 | | |
| JP | 2019138473 | 8/2019 | ............ | F16K 1/36 |
| JP | 2019167982 | 10/2019 | ............ | F16K 1/38 |
| JP | 2020008038 | 1/2020 | ............ | F16K 1/36 |
| JP | 2020041606 | 3/2020 | ............ | F16K 1/44 |
| WO | WO2006090760 | 8/2006 | ............ | F04B 27/18 |
| WO | WO2007119380 | 10/2007 | ............ | F04B 27/14 |
| WO | WO2009025298 | 2/2009 | ............ | F16K 31/06 |
| WO | WO2011114841 | 9/2011 | ............ | F04B 27/14 |
| WO | WO2011132438 | 10/2011 | ............ | F16K 31/06 |
| WO | WO2012077439 | 6/2012 | ............ | F04B 27/14 |
| WO | WO2014098727 | 6/2014 | ............ | F16K 1/36 |
| WO | WO2014119594 | 8/2014 | ............ | F04B 27/14 |
| WO | WO2014148367 | 9/2014 | ............ | F16K 31/06 |
| WO | WO2016194388 | 12/2016 | ............ | F16K 1/00 |
| WO | WO2018124156 | 7/2018 | ............ | F16K 31/06 |
| WO | WO2019131482 | 7/2019 | ............ | F04B 27/18 |
| WO | WO2020110925 | 11/2019 | ............ | F04B 27/18 |

OTHER PUBLICATIONS

U.S. Appl. No. 18/019,230, filed Feb. 1, 2023, Fukudome et al.
U.S. Appl. No. 18/019,060, filed Jan. 31, 2023, Kanzaki et al.
U.S. Appl. No. 18/019,066, filed Jan. 31, 2023, Kanzaki et al.
U.S. Appl. No. 18/017,825, filed Jan. 24, 2023, Hayama et al.
U.S. Appl. No. 18/017,824, filed Jan. 24, 2023, Ejima et al.
U.S. Appl. No. 18/029,063, filed Mar. 28, 2023, Higashidozono et al.
U.S. Appl. No. 18/029,065, filed Mar. 28, 2023, Higashidozono.
International Search Report and Written Opinion and International Preliminary Report on Patentability issued in PCT/JP2021/027769, dated Sep. 7, 2021, 24 pages.
International Search Report and Written Opinion and International Preliminary Report on Patentability issued in PCT/JP2021/027762, dated Oct. 5, 2021, 20 pages.
International Search Report and Written Opinion and International Preliminary Report on Patentability issued in PCT/JP2021/027766, dated Sep. 7, 2021, 24 pages.
International Search Report and Written Opinion and International Preliminary Report on Patentability issued in PCT/JP2021/027770, dated Oct. 5, 2021, 20 pages.
International Search Report and Written Opinion and International Preliminary Report on Patentability issued in PCT/JP2021/027772, dated Sep. 21, 2021, 24 pages.
International Search Report and Written Opinion and International Preliminary Report on Patentability issued in PCT/JP2021/027767, dated Sep. 7, 2021, 22 pages.
International Search Report and Written Opinion and International Preliminary Report on Patentability issued in PCT/JP2021/030007, dated Nov. 2, 2021, 18 pages.
International Search Report and Written Opinion and International Preliminary Report on Patentability issued in PCT/JP2021/034996, dated Dec. 12, 2021, 18 pages.
International Search Report and Written Opinion and International Preliminary Report on Patentability issued in PCT/JP2021/034990, dated Oct. 19, 2021, 18 pages.
International Search Report and Written Opinion and International Preliminary Report on Patentability issued in PCT/JP2021/034995, dated Dec. 14, 2021, 16 pages.
International Search Report and Written Opinion and International Preliminary Report on Patentability issued in PCT/JP2022/033101, dated Sep. 27, 2022, 25 pages.
International Search Report and Written Opinion and International Preliminary Report on Patentability issued in PCT/JP2022/021401, dated Jun. 29, 2022, 17 pages.

* cited by examiner

FLUID CONTROL VALVE

TECHNICAL FIELD

The present invention relates to a fluid control valve which controls a working fluid and, for example, the fluid control valve has a relief function or the like capable of discharging a working fluid.

BACKGROUND ART

A valve used to control a working fluid in various industrial fields includes a valve body brought into contact with and separated from a valve seat and control a flow rate or pressure of a working fluid by adjusting a valve opening degree.

Such a fluid control valve is largely classified into a valve (for example, a pressure reducing valve or the like) which detects a fluid pressure on a secondary side, adjusts a valve opening degree, and restricts a fluid introduction amount from a primary side to control a flow rate or pressure, or the like of a working fluid on the primary side and a valve which detect a fluid pressure of a working fluid and discharges the working fluid to the outside at a predetermined fluid pressure or more to control a flow rate or pressure of the working fluid, that is, a valve having a so-called relief function.

In a shock absorber which is an example of a device which uses the fluid control valve having the relief function, the fluid control valve is fluidly connected to a piston chamber and a reservoir chamber of the shock absorber. A piston is disposed in the piston chamber. Accordingly, in the fluid control valve, the valve body is brought into contact with and separated from the valve seat in accordance with a fluid pressure of the piston chamber changing according to the movement of the piston. By using this movement, the shock absorber can control the damping force.

An example of the fluid control valve having the relief function used in the shock absorber is disclosed in Patent Citation 1 or the like. The fluid control valve herein includes a valve housing, a valve body, a valve seat, and biasing means. The valve housing includes an inflow passage which communicates with the piston chamber of the shock absorber and a discharge passage which communicates with the reservoir chamber. That is, in the fluid control valve, the valve body and the valve seat are provided between the inflow passage and the discharge passage. Further, the valve body is biased in a valve closing direction by the biasing force of the biasing means and can maintain a valve closed state. Then, when a high-pressure working fluid flows into the inflow passage, the valve body is separated from the valve seat against the biasing of the biasing means in the fluid control valve. Accordingly, the fluid control valve is configured to discharge the working fluid from the discharge passage.

CITATION LIST

Patent Literature

Patent Citation 1: JP 2011-501798 A (Pages 6 and 7, FIG. 2)

SUMMARY OF INVENTION

Technical Problem

In this way, in the fluid control valve of Patent Citation 1, the valve body moves while being guided by the valve housing in such a manner that a guide portion of the valve body comes into contact with an inner peripheral surface of the valve housing. Incidentally, in the fluid control valve, contamination may be caught between the inner peripheral surface of the valve housing and the guide portion of the valve body. Accordingly, since resistance to the movement of the valve body is generated, the relief performance of the fluid control valve may deteriorate.

The present invention has been made in view of such problems and an object thereof is to provide a fluid control valve that is less likely to malfunction due to contamination.

Solution to Problem

In order to solve the foregoing problems, a fluid control valve according to the present invention is a fluid control valve including: a valve housing which includes an inflow passage and a discharge passage; a valve seat which is disposed between the inflow passage and the discharge passage; and a valve body which includes a guide portion guided by an inner surface of the valve housing and a seal portion brought into contact with and separated from the valve seat, wherein the guide portion of the valve body includes a flat surface and a tapered surface tapered toward a side of the seal portion. According to the aforesaid features of the present invention, since the guide portion includes the tapered surface tapered from the flat surface and a space exists on the outer radial side of the tapered surface, the valve body can be tilted largely. Accordingly, contamination having flowed between the flat surface of the guide portion of the valve body and the inner surface of the valve housing is easily discharged.

It may be preferable that an outer dimension of the valve body is larger at the tapered surface than at the seal portion. According to this preferable configuration, the valve body can be easily tilted largely, and the seal portion is less likely to be damaged by coming into contact with the inner surface of the valve housing.

It may be preferable that the tapered surface is an inclined surface with respect to an axial direction of the valve body. According to this preferable configuration, since the tapered surface is an inclined surface extending continuously in a linear or curved shape in a cross-sectional view, the valve body can smoothly move with respect to the valve housing.

It may be preferable that a concave portion extending from the flat surface to the tapered surface is formed in the valve body. According to this preferable configuration, contamination having flowed between the flat surface and the inner surface of the valve housing can be discharged from the tapered surface side through the concave portion.

It may be preferable that the concave portion is closed on the flat surface. According to this preferable configuration, the valve body can ensure sealing between the inner surface of the valve housing and the outer surface of the valve body.

It may be preferable that the concave portion is a spiral groove. According to this preferable configuration, the spiral groove that can be configured simply and have high contamination discharge performance is suitable as the concave portion.

DESCRIPTION OF EMBODIMENTS

Modes for carrying out a fluid control valve according to the present invention will be described below based on embodiments.

First Embodiment

A fluid control valve according to a first embodiment of the present invention will be described with reference to FIGS. 1 to 4. Additionally, this embodiment will be described by exemplifying a fluid control valve used in a shock absorber, but can also be applied to other uses. Hereinafter, the top and bottom of the fluid control valve when viewed from the front in FIG. 1 will be described as the top and bottom of the fluid control valve. Specifically, a description will be made such that the lower side of the paper where a main valve 60 is disposed is the lower side of the fluid control valve and the upper side of the paper where a solenoid 80 is disposed as a drive source is the upper side of the fluid control valve.

Figure 1:
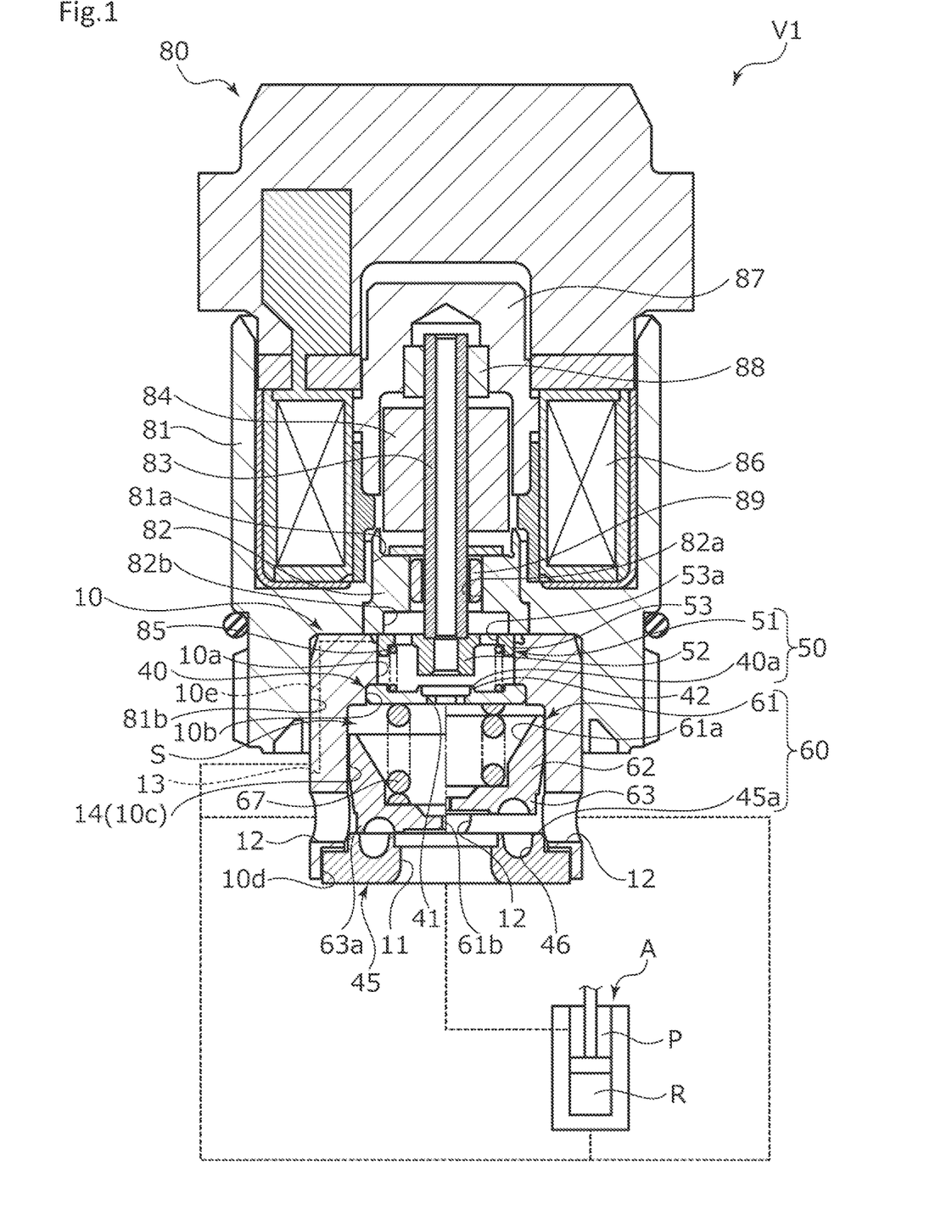
FIG. 1 is a cross-sectional view illustrating a fluid control valve according to a first embodiment of the present invention.

Referring to FIG. 1, a fluid control valve V1 of the present invention is fluidly connected to an absorber piston chamber P and a reservoir chamber R of a shock absorber A.

When the absorber piston moves in the axial direction so that a pressure of a working fluid of an inflow passage 11 increases, the fluid control valve V1 opens the main valve 60 so that the working fluid flows out from a discharge passage 12 to the reservoir chamber R. Accordingly, the fluid control valve V1 controls the flow rate of the working fluid flowing from the absorber piston chamber P toward the reservoir chamber R.

Further, in the fluid control valve V1, the fluid control characteristic of the main valve 60 is adjusted by a pilot valve 50.

Thus, the fluid control valve V1 controls the damping force of the shock absorber A.

As illustrated in FIG. 1, the fluid control valve V1 mainly includes a valve housing 10, the pilot valve 50, the main valve 60, and a solenoid 80.

Among these, the pilot valve 50 is disposed at the upper end portion inside the valve housing 10. Further, the main valve 60 is disposed below the pilot valve 50 inside the valve housing 10.

The pilot valve 50 includes a pilot valve body 51 and a pilot valve seat 40a. The pilot valve 50 is opened and closed in such a manner that the pilot valve body 51 is brought into contact with and separated from the pilot valve seat 40a.

The main valve 60 includes a piston 61 which is a valve body and a main valve seat 45a which is a valve seat. The main valve 60 is opened and closed in such a manner that the piston 61 of the main valve 60 is brought into contact with and separated from the main valve seat 45a.

Additionally, in FIG. 1, the main valve 60 is illustrated with its left half closed and its right half open.

First, the configuration on the side of the valve housing 10 will be described. The components on the side of the valve housing 10 are the valve housing 10, the pilot valve 50, and the main valve 60.

Referring to FIG. 1, the valve housing 10 is formed in a cylindrical shape with an inner step by a metal material or a resin material.

The valve housing 10 is provided with a cylindrical portion 10a, a small-diameter bottomed cylindrical portion 10b, a medium-diameter bottomed cylindrical portion 10c, and a large-diameter bottomed cylindrical portion 10d in order from the top in the axial direction.

The pilot valve body 51 is inserted into the cylindrical portion 10a from above in the axial direction.

The pilot valve body 51 is formed to have a T-shaped cross-section having a cylindrical portion 52 and a flange portion 53.

The cylindrical portion 52 has a cylindrical shape extending in the axial direction. The lower end portion of the cylindrical portion 52 is seated on the pilot valve seat 40a.

Further, a lower end surface of a rod 83 comes into contact with the upper end portion of the cylindrical portion 52. Accordingly, the pilot valve body 51 that receives a biasing force of a coil spring 85 comes into press-contact with the rod 83.

The flange portion 53 has an annular plate shape extending radially outward from the upper end portion of the cylindrical portion 52.

Further, a communication passage 53a is formed in the flange portion 53 to penetrate in the axial direction. The communication passage 53a communicates the cylindrical portion 10a of the valve housing 10 with an opening portion 82b of a center post 82.

Further, the outer peripheral surface of the flange portion 53 is movably formed while being in sliding contact with the inner peripheral surface of the cylindrical portion 10a of the valve housing 10. Accordingly, the cylindrical portion 10a can guide the movement of the pilot valve body 51.

Returning to the configuration of the valve housing 10, the small-diameter bottomed cylindrical portion 10b is continuous to the cylindrical portion 10a and is recessed toward the axially upper side while the inner side of the cylindrical portion 10a is enlarged in diameter.

A pilot valve seat member 40 which is press-inserted from below in the axial direction is integrally fixed to the small-diameter bottomed cylindrical portion 10b in a substantially sealed state.

The pilot valve seat member 40 is formed in a circular plate shape having a plurality of communication passage 41 extending therethrough in the axial direction by a metal material or a resin material.

Further, an annular convex portion 42 which protrudes in the axially upper side is formed at the center of the upper end portion of the pilot valve seat member 40. The upper end portion of the annular convex portion 42 is the pilot valve seat 40a.

Returning to the configuration of the valve housing 10, the medium-diameter bottomed cylindrical portion 10c is continuous to the small-diameter bottomed cylindrical portion 10b and is recessed toward the axially upper side while the inner side of the small-diameter bottomed cylindrical portion 10b is enlarged in diameter.

The piston 61 and the main valve seat 45*a* are arranged on the medium-diameter bottomed cylindrical portion 10*c*.

As illustrated in FIGS. 1 and 2A, the piston 61 includes a guide portion 62, a seal portion 63, and a spiral groove 64 (see FIG. 2A) as a concave portion.

As illustrated in FIG. 1, the piston 61 is provided with a funnel-shaped hollow portion 61*a* which is recessed downward in the axial direction. The hollow portion 61*a* is opened upward in the axial direction. Further, the hollow portion 61*a* communicates with the inflow passage 11 through a communication passage 61*b* formed in the seal portion 63.

As illustrated in FIG. 2A, the outer peripheral surface of the guide portion 62 is composed of a flat surface 65 and a tapered surface 66. Additionally, FIG. 2A illustrates only the configuration of the outer peripheral surface of the piston 61 in order to describe the configuration of the outer peripheral surface of the piston 61. This also applies to FIGS. 2B, 3, 4A, and 4B.

The flat surface 65 extends in the axial direction of the piston 61. Further, the flat surface 65 is continuous in the circumferential direction and has a circular cross-section in the axial direction.

The tapered surface 66 is continuous to the lower end of the flat surface 65 and is tapered toward the seal portion 63. Further, the tapered surface 66 is continuous in the circumferential direction and has a circular cross-section in the axial direction.

Further, the tapered surface 66 of this embodiment is an inclined surface having a linear cross-section extending continuously in a direction inclined with respect to the axis. Additionally, the tapered surface may be an inclined surface having a curved cross-section.

Further, an inner diameter D1 of the medium-diameter bottomed cylindrical portion 10*c* of the valve housing 10 is slightly larger than a maximum outer diameter D2 of the guide portion 62 of the piston 61.

Accordingly, a clearance C is formed between an inner peripheral surface 14 of the medium-diameter bottomed cylindrical portion 10*c* as the inner surface of the valve housing 10 (hereinafter, simply referred to as the "inner peripheral surface 14 of the valve housing 10") and the flat surface 65 and the tapered surface 66 of the guide portion 62.

Therefore, the flat surface 65 and the tapered surface 66 of the guide portion 62 are movable while being in sliding contact with the inner peripheral surface 14 of the valve housing 10. That is, the medium-diameter bottomed cylindrical portion 10*c* can guide the movement of the piston 61.

Further, as illustrated in the left half of the main valve 60 in FIG. 1, in the valve closed state of the main valve 60, the entire flat surface 65 of the guide portion 62 overlaps the inner peripheral surface 14 of the valve housing 10 in the radial direction.

Further, as illustrated in the right half of the main valve 60 in FIG. 1, in the valve open state of the main valve 60, the entire flat surface 65 of the guide portion 62 overlaps the inner peripheral surface 14 of the valve housing 10 in the radial direction.

That is, the entire flat surface 65 radially overlaps the inner peripheral surface 14 of the valve housing 10 over the entire stroke area of the piston 61.

Accordingly, the fluid control valve V1 can ensure sealing between the inner peripheral surface 14 of the valve housing 10 and the guide portion 62 of the piston 61.

Further, an annular convex portion 63*a* which protrudes downward in the axial direction is formed at the outer diameter radial lower end portion of the seal portion 63. The annular convex portion 63*a* is seated on the main valve seat 45*a* in the valve closed state of the main valve 60.

Returning to FIG. 2A, the spiral groove 64 extends continuously from the axial center portion of the flat surface 65 to the axial center portion of the tapered surface 66.

Here, the spiral groove 64 will be described in detail. The spiral groove 64 extends obliquely downward in the circumferential and axial directions from an end portion 64*a* closed at the axial center of the flat surface 65. Then, the spiral groove 64 is closed at an end portion 64*b* located at the axial center portion of the tapered surface 66.

That is, the spiral groove 64 is axially closed in the piston 61. Accordingly, the piston 61 can ensure sealing between the inner peripheral surface 14 of the valve housing 10 and the guide portion 62 of the piston 61.

Further, in the spiral groove 64, the end portion 64*a* of the flat surface 65 and the end portion 64*b* of the tapered surface 66 axially overlap each other. That is, the spiral groove 64 extends substantially one turn in the circumferential direction.

Returning to FIG. 1, a coil spring 67 which serves as biasing means for biasing the piston 61 in the closing direction is disposed between the pilot valve seat member 40 and the piston 61. More specifically, the lower end portion of the coil spring 67 is inserted into the hollow portion 61*a* of the piston 61.

A pilot control chamber S is formed in a space inside the small-diameter bottomed cylindrical portion 10*b* and the medium-diameter bottomed cylindrical portion 10*c* of the valve housing 10. The pilot control chamber S is defined by the small-diameter bottomed cylindrical portion 10*b*, the medium-diameter bottomed cylindrical portion 10*c*, the pilot valve seat member 40, the pilot valve body 51, and the piston 61.

Returning to the configuration of the valve housing 10, the large-diameter bottomed cylindrical portion 10*d* is continuous to the medium-diameter bottomed cylindrical portion 10*c* and is recessed toward the axially upper side while the inside of the medium-diameter bottomed cylindrical portion 10*c* is enlarged in diameter.

A main valve seat member 45 is press-inserted into the large-diameter bottomed cylindrical portion 10*d* from below in the axial direction to be integrally fixed in a substantially sealed state.

The main valve seat member 45 is formed in an annular plate shape having the inflow passage 11 extending therethrough in the axial direction by a metal material or a resin material. The main valve seat member 45 is press-inserted and fixed to the large-diameter bottomed cylindrical portion 10*d* from below in the axial direction through a gasket in a sealed state.

Further, the main valve seat member 45 includes a cylindrical portion 46 extending in the axial direction. The upper end portion of the cylindrical portion 46 is the main valve seat 45*a*.

Returning to FIG. 1, the outer surface of the valve housing 10 is provided with a communication groove 10*e* having a downward L-shaped cross-section from the upper end of the cylindrical portion 10*a* to the side surface thereof.

Further, the lower side end portion of the communication groove 10*e* is located below an opening portion 81*b* of a casing 81 and is opened in the outer radial direction.

Accordingly, the communication groove 10*e* constitutes a pilot side discharge passage 13 of the pilot valve 50.

More specifically, the pilot side discharge passage 13 includes the cylindrical portion 10*a*, the small-diameter bottomed cylindrical portion 10*b*, and the communication groove 10e of the valve housing 10, the annular convex portion 42 of the pilot valve seat member 40, the opening portion 81b of the casing 81, and the opening portion 82b of the center post 82.

Further, the valve housing 10 is provided with the discharge passage 12 which extends radially outward from the medium-diameter bottomed cylindrical portion 10c and communicates the inside of the medium-diameter bottomed cylindrical portion 10c with the reservoir chamber R.

Next, the solenoid 80 will be described. The solenoid 80 is connected to the valve housing 10 and applies a driving force to the pilot valve body 51.

The solenoid 80 mainly includes the casing 81, the center post 82, the rod 83, a movable iron core 84, the coil spring 85, a coil 86, a sleeve 87, and bearings 88 and 89.

The casing 81 includes a stepped cylindrical main body portion 81a into which the center post 82 is inserted and fixed from below in the axial direction.

Further, the opening portion 81b which is continuous to the lower end of the main body portion 81a and is opened downward is formed in the casing 81.

The center post 82 is formed in a stepped cylindrical shape from a rigid body made of a magnetic material such as iron or silicon steel.

The center post 82 includes a cylindrical main body portion 82a extending in the axial direction. The bearing 89 is inserted and fixed to the main body portion 82a from above in the axial direction.

Further, the opening portion 82b which is continuous to the lower end of the main body portion 82a and is opened toward the lower side of the center post 82 is formed in the center post 82.

The rod 83 is formed in a cylindrical shape. The rod 83 is inserted through the center post 82 and is disposed to reciprocate in the axial direction.

Further, the rod 83 is inserted and fixed to the movable iron core 84. Accordingly, when the solenoid 80 is energized, the rod 83 moves to follow the movable iron core 84 moving in the valve closing direction. Accordingly, the rod 83 moves the pilot valve body 51 in the valve closing direction, that is, downward in the axial direction.

In the rod 83, the upper end portion is inserted through the bearing 88 and the lower end portion is inserted through the bearing 89. By these bearings 88 and 89, the axial movement of the rod 83 is guided. Therefore, the rod 83 is less likely to be tilted in the radial direction during the axial movement.

The coil spring 85 is disposed between the pilot valve seat member 40 and the pilot valve body 51.

The coil spring 85 biases the pilot valve body 51 in the valve opening direction of the pilot valve 50, that is, in the axially upper side.

The coil 86 is an excitation coil wound around the center post 82 through a bobbin.

The sleeve 87 is formed in a bottomed cylindrical shape. Further, the bearing 88 guiding the movement of the rod 83 is fitted and fixed to the sleeve 87.

Next, the operation of the fluid control valve V1 and mainly the opening and closing operations of the pilot valve 50 and the main valve 60 will be described with reference to FIGS. 1 to 4.

First, the fluid control valve V1 in the de-energized state will be described. Referring to FIG. 1, the pilot valve body 51 of the pilot valve 50 is pressed toward the axially upper side by the biasing force of the coil spring 85 in the de-energized state. Accordingly, the pilot valve body 51 is separated from the pilot valve seat 40a and the pilot valve 50 is opened. The pilot valve opening degree at this time is the maximum in this embodiment.

When the shock absorber A is operated so that the pressure of the working fluid in the inflow passage 11 increases in the de-energized state, the working fluid passes through the communication passage 61b of the piston 61 and the pilot control chamber S and flows from the pilot side discharge passage 13 into the reservoir chamber R. Along with this, the working fluid may also flow into the reservoir chamber R from the discharge passage 12 depending on the pressure of the working fluid as will be described below.

In the fluid control valve V1, the cross-sectional area of the communication passage 61b in the piston 61 is formed to be narrow. Therefore, even when the pressure of the working fluid in the inflow passage 11 increases, the pressure of the working fluid in the pilot control chamber S is less likely to increase in response to the pressure of the working fluid in the inflow passage 11. Therefore, a differential pressure is generated between the pressure of the working fluid in the inflow passage 11 and the pressure of the working fluid in the pilot control chamber S. As this differential pressure increases, the main valve 60 becomes easier to open.

Additionally, in the following description, the pressure of the working fluid in the inflow passage 11 is described as the "pressure Pin of the inflow passage 11" and the pressure of the working fluid in the pilot control chamber S is described as the "pressure Ps of the pilot control chamber S".

When a differential pressure ΔP (=Pin−Ps) between the pressure Pin of the inflow passage 11 and the pressure Ps of the pilot control chamber S decreases after the main valve 60 is opened, the main valve 60 is closed.

The factor that the differential pressure ΔP decreases is that the working fluid passes through the main valve 60 and flows from the discharge passage 12 into the reservoir chamber R so that the pressure Pin of the inflow passage 11 decreases, the working fluid flows from the communication passage 61b into the pilot control chamber S so that the pressure Pin of the inflow passage 11 decreases, the volume is narrowed due to the movement of the piston 61 so that the pressure Ps of the pilot control chamber S increases, and the like. Hereinafter, the opening and closing operation of the main valve 60 will be described in more detail with specific examples.

Referring to the left half of FIG. 1, for example, when the pressure Pin of the inflow passage 11 is smaller than a small pressure value P1 (Pin<P1) such as when the absorber piston in the shock absorber A reciprocates with a minute stroke when traveling on a smooth road surface, the seal portion 63 of the piston 61 is seated on the main valve seat 45a by the biasing force of the coil spring 67. That is, the main valve 60 is closed.

Referring to the right half of FIG. 1, in the main valve 60, for example, when the pressure Pin of the inflow passage 11 is a pressure value P2 which is equal to or larger than the small pressure value P1 (P2≥P1) such as when the absorber piston in the shock absorber A reciprocates repeatedly with a small stroke when traveling on an uneven road surface, the piston 61 moves in the axially upper side against the biasing force of the coil spring 67.

That is, the seal portion 63 of the piston 61 is separated from the main valve seat 45a and the main valve 60 is opened. Accordingly, the working fluid flows from the discharge passage 12 into the reservoir chamber R.

At this time, the extra working fluid in the pilot control chamber S flows from the pilot side discharge passage 13 into the reservoir chamber R as the piston 61 moves.

Additionally, as described above, since the main valve 60 is closed as the differential pressure ΔP decreases as described above, the valve opening degree of the main valve 60 increases as the pressure Pin (i.e., P2) of the inflow passage 11 approaches a large pressure value P3 (P3>P2).

Similarly, for example, even when the pressure Pin of the inflow passage 11 is equal to or larger than the large pressure value P3 (Pin P3) such as when the absorber piston in the shock absorber A tries to make a large stroke in order to overcome a step on the road surface, the piston 61 moves in the axially upper side against the biasing force of the coil spring 67.

Accordingly, since the main valve 60 is opened, the working fluid flows from the discharge passage 12 into the reservoir chamber R. Further, the extra working fluid in the pilot control chamber S flows from the pilot side discharge passage 13 into the reservoir chamber R.

Additionally, when the pressure Pin of the inflow passage 11 is equal to or larger than the large pressure value P3 (Pin>P3), the valve opening degree of the main valve 60 is maximized in this embodiment.

Then, when the working fluid flows from the discharge passage 12 into the reservoir chamber R through the main valve 60, the coil spring 67 expands to decrease the valve opening degree as the pressure Pin of the inflow passage 11 decreases, and the pressure Pin of the inflow passage 11 is smaller than the small pressure value P1 (Pin<P1), the seal portion 63 of the piston 61 is seated on the main valve seat 45a so that the main valve 60 is closed.

Next, the control of the damping force by the pilot valve 50 in the fluid control valve V1 in the energized state will be mainly described. Additionally, since the main valve 60 is operated in the energized state in substantially the same manner as in the de-energized state, the description thereof will be omitted.

Referring to FIG. 1, when the electromagnetic force generated by applying a current to the solenoid 80 exceeds the biasing force of the coil spring 85 in the energized state (that is, during so-called duty control), the movable iron core 84 is drawn toward the center post 82, that is, downward in the axial direction.

Accordingly, the rod 83 fixed to the movable iron core 84 moves downward in the axial direction together with the pilot valve body 51. Accordingly, the pilot valve 50 is closed when the pilot valve opening degree decreases and a current exceeding a predetermined level is energized.

When the pilot valve opening degree is small compared to the de-energized state, the working fluid in the inflow passage 11 flows from the pilot side discharge passage 13 into the reservoir chamber R in accordance with the operation of the shock absorber A as in the de-energized state. Further, as described above, the working fluid also flows from the discharge passage 12 into the reservoir chamber R depending on the pressure Pin of the inflow passage 11.

Then, the working fluid is less likely to flow from the pilot control chamber S into the pilot side discharge passage 13 as the pilot valve opening degree decreases. Therefore, the differential pressure ΔP between the pressure Pin of the inflow passage 11 and the pressure Ps of the pilot control chamber S is less likely to occur and the main valve 60 is less likely to open. That is, the damping force of the shock absorber A can be increased.

In other words, when the pilot valve opening degree is maximized, the damping force of the shock absorber A is minimized. That is, the damping force is controlled to be minimized when the fluid control valve V1 is in the non-energized state.

Furthermore, even when the main valve 60 is opened, the differential pressure ΔP decreases in a short time as the pilot valve opening degree of the pilot valve 50 decreases. That is, the opening time of the main valve 60 is shortened as the pilot valve opening degree of the pilot valve 50 decreases.

For these reasons, the fluid control characteristics of the main valve 60 are controlled according to the pilot valve opening degree of the pilot valve 50. Accordingly, the fluid control valve V1 can variably control the damping force of the shock absorber A.

When a high-pressure Pin occurs in the inflow passage 11 even when the pilot valve 50 is closed due to a current exceeding a predetermined level, the pilot valve 50 is slightly opened by this working fluid. Accordingly, the working fluid flows from the pilot side discharge passage 13 into the reservoir chamber R similarly to the de-energized state.

In this way, when the pilot valve 50 is closed in the energized state, the fluid control valve V1 is in a state in which the working fluid is most difficult to pass through the pilot valve 50 and the main valve 60 is difficult to open. Therefore, the fluid control valve V1 can maximize the damping force of the shock absorber A.

Additionally, a current value to be energized to the coil 86 constituting the solenoid 80 is set based on input parameters such as vehicle speed, vehicle acceleration/deceleration, steering angle, road surface condition, and sprung load.

Further, the pilot valve 50 in the open state may be closed by setting a current value equal to or larger than a predetermined value.

Next, the state when the piston 61 moves will be described in more detail with reference to FIGS. 2 to 4. Additionally, in FIGS. 2 to 4, for convenience of description, the flat surface 65 and tapered surface 66 of the guide portion 62 and the clearance C between the inner peripheral surface 14 of the valve housing 10 and the guide portion 62 of the piston 61 are exaggeratingly illustrated.

First, a normal state in which the piston 61 moves substantially parallel along the axis of the valve housing 10 (hereinafter, simply referred to as a "normal state") will be described. Next, a state in which the piston 61 moves while being tilted (see FIG. 4) will be described.

As illustrated in FIG. 2A, the clearance C having approximately the same dimension is formed over the circumferential direction between the inner peripheral surface 14 of the valve housing 10 and the flat surface 65 of the guide portion 62 of the piston 61 in the normal state.

Oil as a lubricant, a working fluid, or the like flows into the clearance C.

Accordingly, the piston 61 can smoothly move in the axial direction along the axis of the valve housing 10.

At this time, the tapered surface 66 of the piston 61 is a smooth surface without unevenness. Therefore, the piston 61 can smoothly move with respect to the valve housing 10.

Further, the radial dimension L1 of the tapered surface 66, that is, sine length is smaller than the radial dimension L2 of the clearance C in the normal state (L1<L2).

Even when the piston 61 is tilted slightly due to vibration, disturbance, and the like accompanying the movement of the piston 61, the tapered surface 66 can guide the movement of the piston 61. Then, the tapered surface 66 of the piston 61 is a smooth surface without unevenness. Therefore, the piston 61 can smoothly slide on the valve housing 10.

Here, a piston 61A constituting a main valve 60A of a fluid control valve of a reference example (hereinafter, simply referred to as a "piston 61A" or a "piston 61A as a comparative object") will be described with reference to FIG. 2B. A guide portion 62A of the piston 61A includes only a flat surface 65A. Further, other configurations of the piston 61A are substantially the same as those of the piston 61.

The clearance C into which oil as a lubricant, a working fluid, or the like flows exists between the inner peripheral surface 14 of the valve housing 10 and the flat surface 65A of the guide portion 62A of the piston 61A. Accordingly, the piston 61A is movable along the axis of the valve housing 10 similarly to the piston 61.

Next, the tilting of the piston 61 in this embodiment will be described in detail.

Additionally, since the piston 61 is configured to move while being guided by the inner peripheral surface 14 of the valve housing 10 according to the urging force and differential pressure from the coil spring 67, the tilting becomes easier than the pilot valve body 51 that moves together with the rod 83 while being guided by the bearings 88 and 89.

Figure 3:
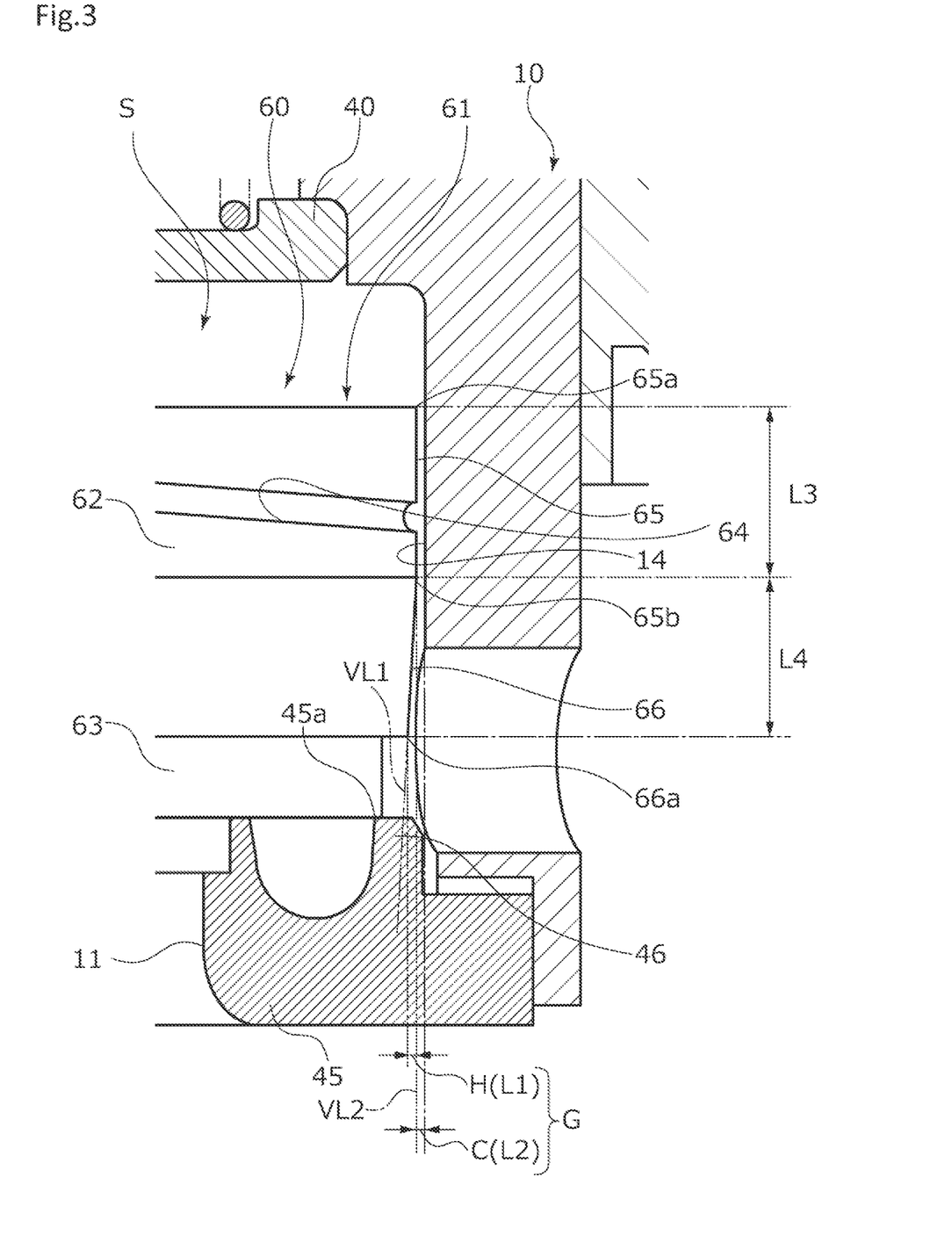
FIG. 3 is an enlarged view illustrating a main part of the fluid control valve of the first embodiment.

As illustrated in FIG. 3, the radial dimension L1 of the tapered surface 66 is smaller than the dimension L2 of the clearance C in the normal state (L1<L2).

Further, the axial dimension L3 of the flat surface 65 is substantially the same as the axial dimension L4 of the tapered surface 66 (L3=L4).

As illustrated in FIG. 4A, the piston 61 can be tilted until the upper end portion of the flat surface 65 and the lower end portion of the tapered surface 66 located on the diagonal line of the upper end portion come into contact with the inner peripheral surface 14 of the valve housing 10.

The upper end portion of the flat surface 65 is the corner 65a and a portion in the vicinity thereof. Further, the lower end portion of the tapered surface 66 is the corner 66a and a portion in the vicinity thereof. Additionally, the corners 65a and 66a may be rounded as the R surface and in that case, the R surface or the vicinity thereof comes into contact with the inner peripheral surface 14 of the housing 10 when the piston 61 is tilted.

In other words, an axis Ax2 of the piston 61 indicated by the one-dotted chain line in FIG. 4A can be tilted up to an angle θ1 with respect to an axis Ax1 of the valve housing 10 indicated by the one-dotted chain line in FIG. 4A.

Therefore, when the piston 61 is tilted, the corners 65a and 66a are less likely to come into angular-contact with the inner peripheral surface 14 of the valve housing 10. Accordingly, in the fluid control valve V1, the abrasion of the corners 65a and 66a, the damage due to the contact of the corners 65a and 66a with respect to the inner peripheral surface 14, and the like are prevented. Further, in this embodiment, since the tapered surface 66 follows the inner peripheral surface 14 of the valve housing 10 when the piston 61 is tilted, the angular contact is less likely to occur in the corner 66a than in the corner 65a.

Further, the corner 65b between the flat surface 65 and the tapered surface 66 is difficult to come into angular-contact with the inner peripheral surface 14 of the valve housing 10. Accordingly, since the spiral groove 64 crossing a part of the corner 65b is less likely to come into contact with the inner peripheral surface 14, damage is suppressed.

Additionally, various dimensions of the piston 61 may be appropriately changed. However, from the view point of protecting the spiral groove 64, it is preferable that the corner 65b be separated from the flat surface 65 in order to prevent the angular contact of the corner 65b.

Figure 2:
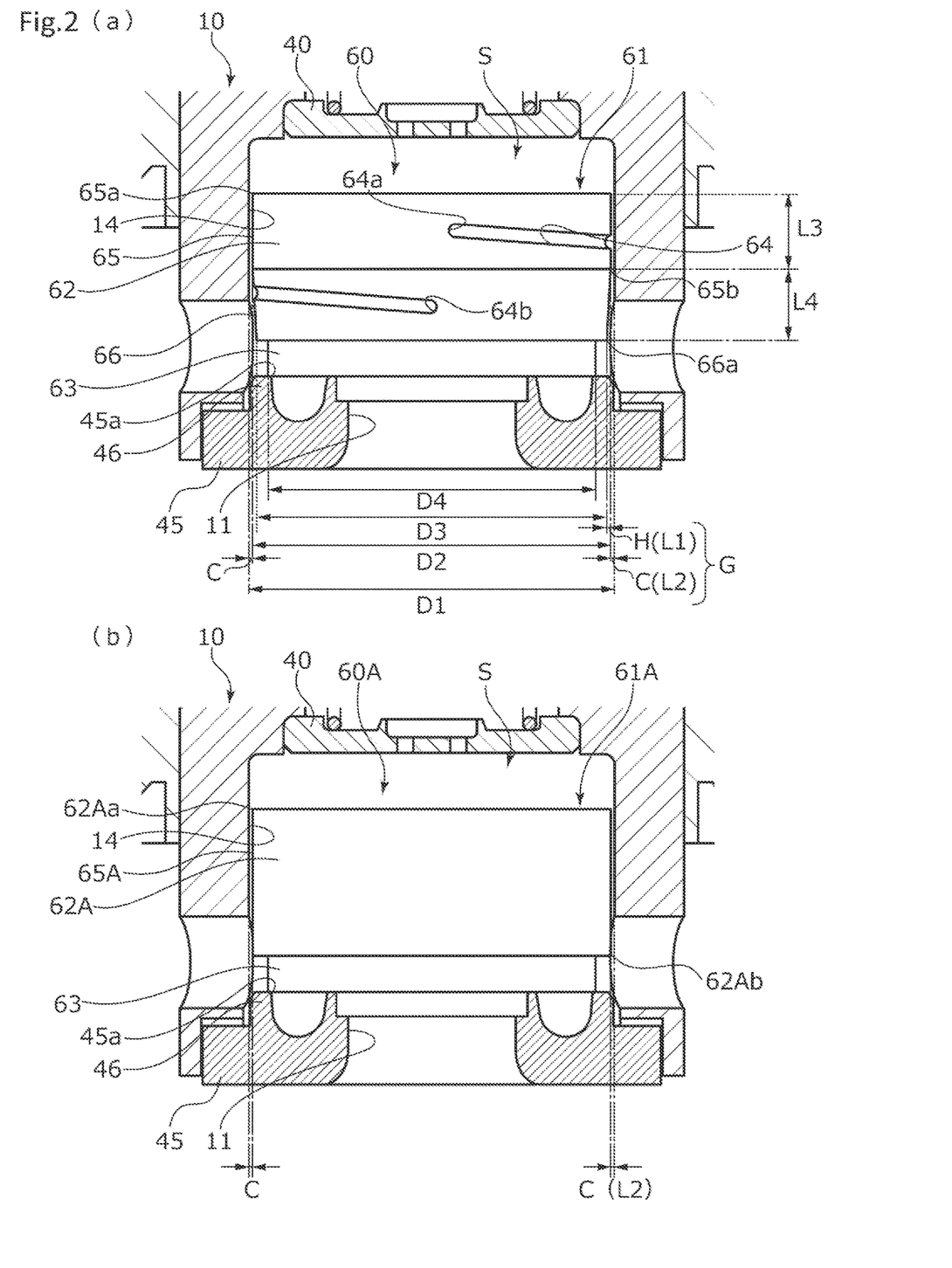
FIG. 2A is an enlarged explanatory diagram illustrating a main valve of the fluid control valve of the first embodiment and FIG. 2B is an enlarged explanatory diagram illustrating a main valve in which only a flat surface constitutes a guide portion of a valve body of a fluid control valve of a reference example.

Further, as illustrated in FIG. 2, the minimum outer diameter D3 of the tapered surface 66 is larger than the outer diameter D4 of the seal portion 63 (D3>D4). In addition, as illustrated in FIG. 3, the outer radial end of the seal portion 63 is disposed on the inner radial side of a virtual extension line VL1 of the tapered surface 66 in the radial direction.

Accordingly, the piston 61 prevents the seal portion 63 from contacting the inner peripheral surface 14 before the tapered surface 66 contacts the inner peripheral surface 14 of the valve housing 10. Therefore, the piston 61 is easily tilted within a range in which the seal portion 63 does not easily contact and damage the inner peripheral surface 14 of the valve housing 10.

Here, the tilting of the piston 61A as a comparative object will be described. As illustrated in FIG. 4B, the piston 61A as a comparative object can be tilted until the upper end portion of the flat surface 65A and the lower end portion of the flat surface 65A located on the diagonal line of the upper end portion contact the inner peripheral surface 14 of the valve housing 10.

Additionally, the upper end portion of the flat surface 65A is a portion which is continuous to a corner 62Aa between the flat surface 65A and the upper end surface of the piston 61A in the flat surface 65A. Further, the lower end portion of the flat surface 65A is a portion which is continuous to a corner 62Ab between the flat surface 65A and the lower end surface of the guide portion 62A in the flat surface 65A.

In other words, an axis Ax3 of the piston 61A indicated by the one-dotted chain line in FIG. 4B can be tilted up to an angle θ2 with respect to the axis Ax1 of the valve housing 10 indicated by the one-dotted chain line in FIG. 4B.

As described above, the radial dimension L1 of the tapered surface 66 is smaller than the dimension L2 of the clearance C (L1<L2). Therefore, in the piston 61 of this embodiment, a space H which is wider than the clearance C and is narrower than twice the clearance C is formed between the tapered surface 66 and the inner peripheral surface 14 in the valve housing 10 to be located between the outer radial side of the tapered surface 66 and a virtual extension line VL2 of the flat surface 65 (L2<H=L1<2×L2).

Accordingly, the piston 61 of this embodiment can be tilted more than the piston 61A as a comparative object. That is, the tiltable angle θ1 of the piston 61 of this embodiment is larger than the tiltable angle θ2 of the piston 61A as a comparative example (θ1>θ2).

Next, the pistons 61 and 61A which are in a state in which contamination is caught between the inner peripheral surface 14 of the valve housing 10 and the flat surface 65 of the guide portion 62 of the piston 61 (hereinafter, simply referred to as a "caught state") will be described.

Figure 4:
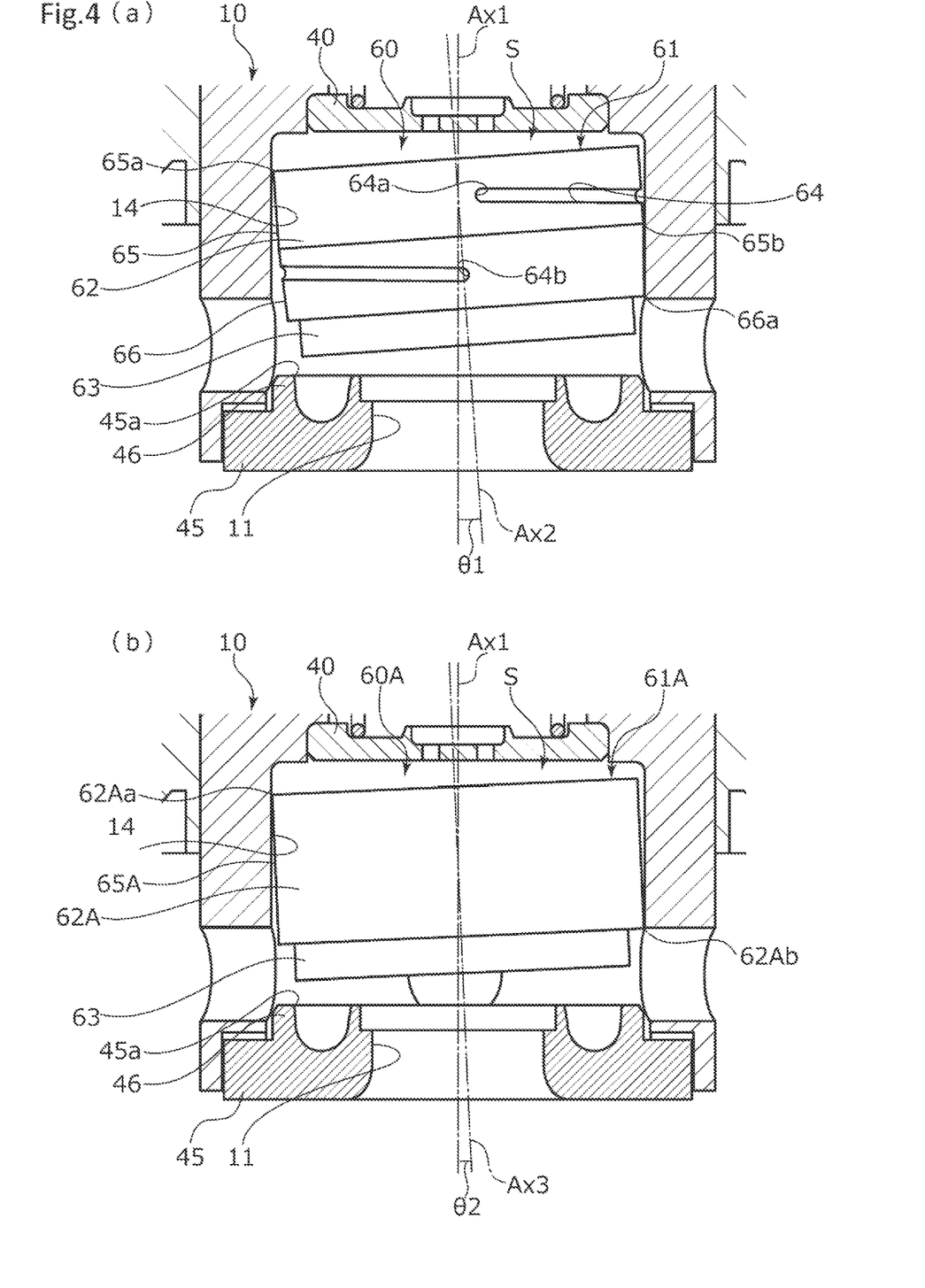
FIG. 4A is an enlarged explanatory diagram illustrating a tilted state of the main valve in the fluid control valve of the first embodiment and FIG. 4B is an enlarged explanatory diagram illustrating a tilted state of the main valve in which only the flat surface constitutes the guide portion of the valve body in the fluid control valve of the reference example.

Referring to FIG. 4, the piston 61 and the piston 61A may be tilted with the caught contamination as a base point in the caught state.

At this time, in the piston 61A as a comparative example in which the tiltable angle θ2 is small, it is difficult to obtain an opening sufficient to discharge contamination. Therefore, it is difficult to discharge contamination caught in the piston 61A.

On the other hand, in the piston 61 of the present invention in which the tiltable angle θ1 is large, it is easy to obtain an opening that is sufficient to discharge contamination. Therefore, contamination caught in the piston 61 can be easily discharged.

Further, even when tilted by the angle θ1, the piston 61 can slide smoothly with respect to the valve housing 10 as described above.

Regardless of whether or not the pistons 61 and 61A are tilted in the caught state, the contamination may move relatively with respect to the pistons 61 and 61A as the pistons 61 and 61A move.

At this time, in the piston 61A as a comparative object, the caught state continues until the contamination moves out of the flat surface 65A as the contamination moves relatively with respect to the piston 61A.

On the other hand, the piston 61 of the present invention is provided with the spiral groove 64 which is recessed radially inward. Accordingly, contamination flows into the spiral groove 64 and the piston 61 is released from the caught state.

Further, the spiral groove 64 extends obliquely downward in the axial direction and extends substantially one turn in the circumferential direction. In other words, the spiral groove 64 has a wide area in which contamination can be collected in the circumferential direction and the axial direction.

Therefore, since contamination mainly moves relatively with respect to the piston 61 in the axial direction in accordance with the movement of the piston 61, the spiral groove 64 can efficiently collect contamination that is displaced in the axial direction.

Further, the piston 61 is rotatable in the circumferential direction. Therefore, since the piston 61 rotates in accordance with the axial movement, the spiral groove 64 can efficiently collect contamination that is displaced in the circumferential direction.

Further, the spiral groove 64 that extends to the tapered surface 66 tends to introduce contamination into the gap G (see FIG. 2A) between the inner peripheral surface 14 of the valve housing 10 and the tapered surface 66. The gap G is composed of the clearance C and the space H (G>C).

Further, the gap G (see FIG. 2A) is opened toward the discharge passage 12.

Further, the space between the flat surface 65 of the piston 61 and the inner peripheral surface 14 of the valve housing 10 is sealed over the entire stroke area of the piston 61 as described above. Therefore, the working fluid having flowed into the inflow passage 11 moves toward the discharge passage 12.

Thus, contamination discharged into the gap G (see FIG. 2A) is easily discharged through the discharge passage 12 to the outside of the fluid control valve V1.

Second Embodiment

Figure 5:
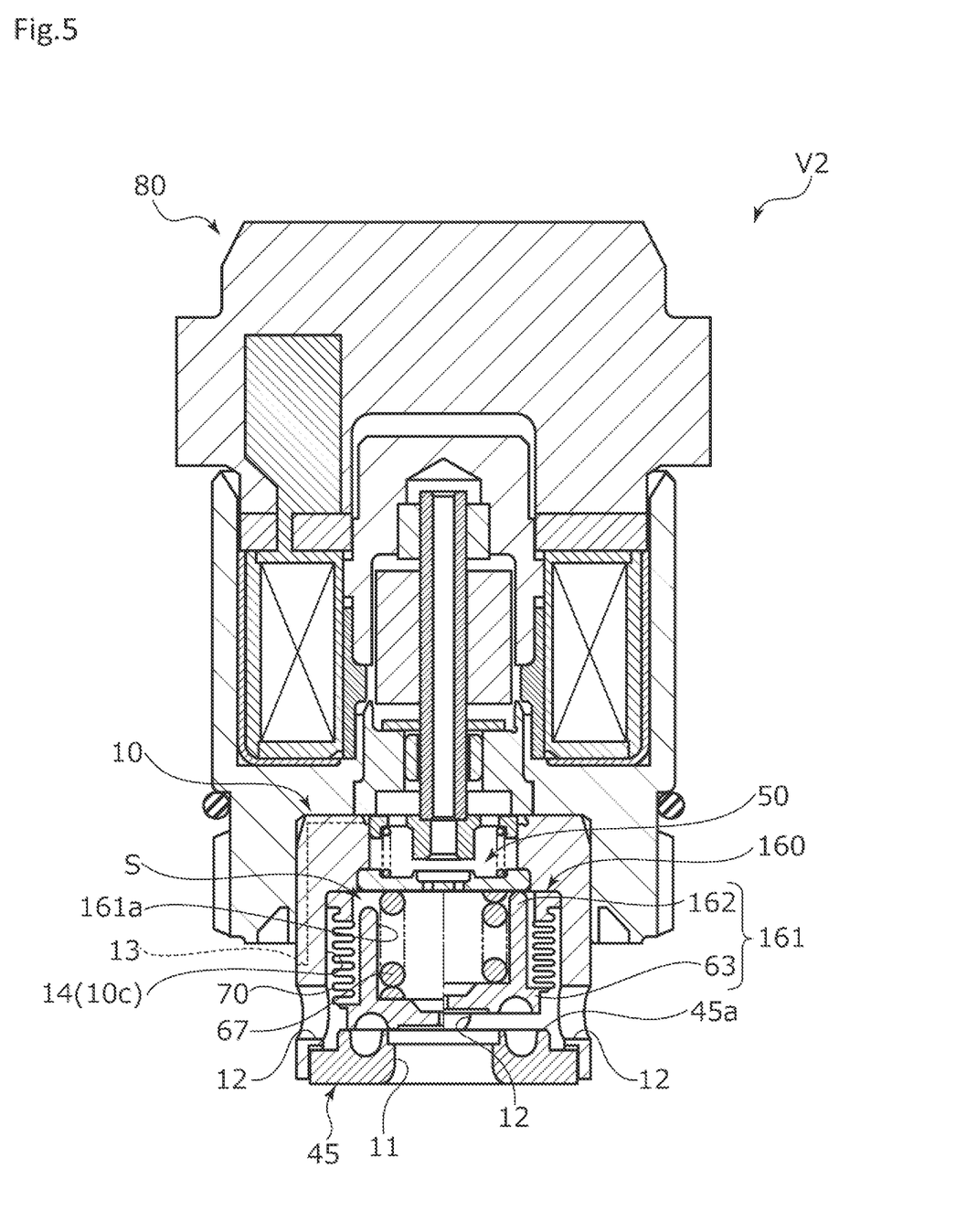
FIG. 5 is a cross-sectional view illustrating a fluid control valve according to a second embodiment of the present invention.

Next, a fluid control valve of a second embodiment will be described with reference to FIG. 5. Additionally, the description of the overlapping configuration which is the same as that of the first embodiment will be omitted.

In a fluid control valve V2 of the second embodiment, a main valve 160 includes a piston 161 which is a valve body, the main valve seat 45a, and a bellows 70.

A hollow portion 161a which is recessed in a cylindrical shape downward in the axial direction is formed in the piston 161. The hollow portion 161a is opened upward in the axial direction. Further, the hollow portion 161a communicates with the inflow passage 11 through the communication passage 61b formed in the seal portion 63.

Further, the piston 161 includes a base portion 162 and the seal portion 63.

The base portion 162 is formed in a cylindrical shape. Further, the outer diameter of the base portion 162 is smaller than the outer diameter of the seal portion 63. That is, the seal portion 63 protrudes radially outward in a flange shape from the outer peripheral surface of the base portion 162.

The upper end portion of the bellows 70 is fixed to the corner portion of the medium-diameter bottomed cylindrical portion 10c of the valve housing 10. Further, the lower end portion of the bellows 70 is fixed to the outer radial end portion of the seal portion 63.

Further, a sufficient gap is formed between the bellows 70 and the inner peripheral surface 14 of the valve housing 10 so that the bellows 70 is less likely to come into contact with the inner peripheral surface 14 when the piston 161 moves.

Accordingly, the piston 161 is movable in the axial direction while being prevented from tilting by the bellows 70.

Further, malfunction caused by contamination caught between the inner peripheral surface 14 of the valve housing 10 and the piston 161 is prevented.

Although the embodiments of the present invention have been described above with reference to the drawings, the specific configuration is not limited to these examples, and any changes or additions that do not depart from the scope of the present invention are included in the present invention.

For example, in the above-described embodiments, a configuration has been described in which the fluid control valve includes the pilot valve and the main valve, but the present invention is not limited thereto. That is, the fluid control valve may include only the main valve.

Further, in the above-described embodiments, a configuration has been described in which the inflow passage and the discharge passage of the housing are formed so that the working fluid flows therethrough, but the present invention is not limited thereto. That is, a connector may be connected to the inflow passage and the discharge passage of the housing, and the working fluid may flow into the housing through the connector. That is, the present invention is not limited to a configuration in which the working fluid directly flows and the inflow passage, and the discharge passage may be formed for the inflow or discharge of the working fluid.

Further, in the above-described embodiments, a configuration has been described in which the valve seat is formed in the valve seat member separated from the valve housing, but the present invention is not limited thereto. That is, the valve seat may be integrally formed with the valve housing.

Further, in the above-described embodiments, a configuration has been described in which the valve housing is formed in a cylindrical shape, but the present invention is not limited thereto. For example, its shape may be appropriately changed such that the valve housing is formed in a polygonal cylindrical shape. That is, the inner surface of the valve housing is not limited to the circular inner peripheral surface when viewed in the axial direction and may be a polygonal inner surface when viewed in the axial direction.

Furthermore, the inner surface of the valve housing may be divided in the circumferential direction by grooves or the like extending axially. That is, the inner surface of the valve housing may be discontinuous in the circumferential direction.

Further, in the above-described embodiments, a case has been described in which the valve body is the bottomed cylindrical piston, but the present invention is not limited thereto. For example, its shape may be appropriately changed such that the valve body has a polygonal bottomed cylindrical shape. That is, the flat surface and the tapered surface of the valve body are not limited to the circular shape when viewed in the axial direction and may be the polygonal shape when viewed in the axial direction.

Further, in the above-described embodiments, a configuration has been described in which the flat surface and the tapered surface of the valve body are continuous in the circumferential direction, but the present invention is not limited thereto. For example, the flat surface and the tapered surface may be divided in the circumferential direction by grooves or the like extending axially. That is, the flat surface and the tapered surface of the valve body may be discontinuous in the circumferential direction.

Further, in the above-described embodiments, a configuration has been described in which the outer peripheral surface of the guide portion is formed as the flat surface and the tapered surface, but the present invention is not limited thereto. That is, its shape may be appropriately changed such that another tapered surface is formed above the flat surface in the axial direction and a groove extending in the circumferential direction is formed between the flat surface and the tapered surface of the valve body.

Further, in the above-described embodiments, a configuration has been described in which the tapered surface of the valve body is the inclined surface, but the present invention is not limited thereto. That is, the tapered surface may be appropriately changed such that the tapered surface is formed in a stepped shape consisting of a plurality of steps or may be a part of a spherical shape.

Further, in the above-described embodiments, a configuration has been described in which the concave portion is the spiral groove, but the present invention is not limited thereto. That is, the concave portion may be appropriately changed to a groove which extends in the axial direction, a groove which extends in the radial direction, a concave portion which is recessed radially inward and is opened radially outward, or the like.

Further, in the above-described embodiments, a configuration has been described in which the concave portion is one spiral groove, but the present invention is not limited thereto. That is, a plurality of concave portions may be formed.

Further, in the above-described embodiments, a configuration has been described in which the spiral groove extends substantially one turn in the circumferential direction, but the present invention is not limited thereto. For example, the spiral groove may extend over one or more turns. For example, if the spiral groove extends over one or more turns in the flat surface, contamination can be collected in the entire area of the flat surface in the circumferential direction.

Further, in the above-described embodiments, a configuration has been described in which the spiral groove extends substantially one turn in the circumferential direction, but the present invention is not limited thereto. That is, the spiral groove may extend less than one turn in the circumferential direction. In this case, it is preferable that a plurality of spiral grooves having less than one turn in the circumferential direction are formed in the circumferential direction.

Further, a configuration has been described in which the biasing means for biasing the piston in the valve closing direction is the coil spring, but the present invention is not limited thereto. That is, a pull spring may be used, a pressure may be different from the pressure of the inflow passage, and various cylinders and the like may be used.

REFERENCE SIGNS LIST

10 Valve housing
11 Inflow passage
12 Discharge passage
14 Inner peripheral surface (inner surface)
60 Main valve
61 Piston (valve body)
62 Guide portion
63 Seal portion
64 Spiral groove
65 Flat surface
66 Tapered surface
67 Coil spring (biasing means)
70 Bellows
160 Main valve
161 Piston
162 Base portion
Ax1 to Ax3 Axis
C Clearance
V1 Fluid control valve
V2 Fluid control valve
θ1, θ2 Angle

The invention claimed is:

1. A fluid control valve, comprising:
a valve housing which includes an inflow passage and a discharge passage;
a valve seat which is disposed between the inflow passage and the discharge passage; and
a valve body which includes a guide portion guided by an inner surface of the valve housing and a seal portion brought into contact with and separated from the valve seat,
wherein the guide portion of the valve body includes a flat surface and a tapered surface inclined with respect to the flat surface so as to be tapered toward a side of the seal portion side from an edge of the flat surface on a seal portion side in an axial direction of the valve body,
wherein a dimension difference (L1) between a radius of a first axial end edge of the tapered surface and a radius of a second axial end edge of the tapered surface is smaller than a clearance (L2) between the flat surface and the inner surface of the valve housing in a state in which the valve body is disposed coaxially with the valve housing, and
wherein a concave portion extending from the flat surface to the tapered surface is formed in the valve body, the concave portion extending at least partially in a circumferential direction along both the flat surface and the tapered surface.

2. The fluid control valve according to claim 1, wherein an outer dimension of the valve body is larger at the tapered surface than at the seal portion.

3. The fluid control valve according to claim 2, wherein the concave portion is closed on the flat surface.

4. The fluid control valve according to claim 2, wherein the concave portion is a spiral groove.

5. The fluid control valve according to claim 1, wherein the concave portion is closed on the flat surface.

6. The fluid control valve according to claim 1, wherein the concave portion is a spiral groove.

* * * * *